United States Patent [11] 3,625,324

| [72] | Inventor | Herbert D. Scharf<br>437 Merwyn Road, Merion, Pa. 19066 |
|---|---|---|
| [21] | Appl. No. | 71,164 |
| [22] | Filed | Sept. 10, 1970 |
| [45] | Patented | Dec. 7, 1971<br>Continuation of application Ser. No. 47,465, June 18, 1970, now abandoned. This application Sept. 10, 1970, Ser. No. 71,164 |

[54] ROLLER CLUTCH ASSEMBLY
3 Claims, 6 Drawing Figs.

[52] U.S. Cl. .................................................. 192/45
[51] Int. Cl. ................................................. F16d 15/00, F16d 41/06
[50] Field of Search ......................................... 192/38, 45; 188/82.84; 267/151

[56] References Cited
UNITED STATES PATENTS
521,942   6/1894   Swan ............................... 188/82.84

3,500,977   3/1970   Gehrke ........................ 192/45

FOREIGN PATENTS
1,073,623   3/1954   France ........................ 267/151

Primary Examiner—Allan D. Herrmann
Attorney—Caesar, Rivise, Bernstein & Cohen

ABSTRACT: In a roller clutch assembly including the conventional crankshaft-cam-flywheel arrangement wherein rotation of the flywheel ring may be transmitted to the cam through engaged drive rollers, the improvement comprising forming slots in the cage retainer walls to receive flexible tubing for each drive roller, whereby when the roller clutch is brought to the actuated position each drive roller will be in resilient contact with its corresponding piece of tubing such that rotation is transmitted from the flywheel ring to the cam through all of the drive rollers, and wherein in disengaged position the cage retainer wall, through direct contact between the tubing and each individual roller urges the rollers against the next retainer arcuate wall and away from the rotating ring.

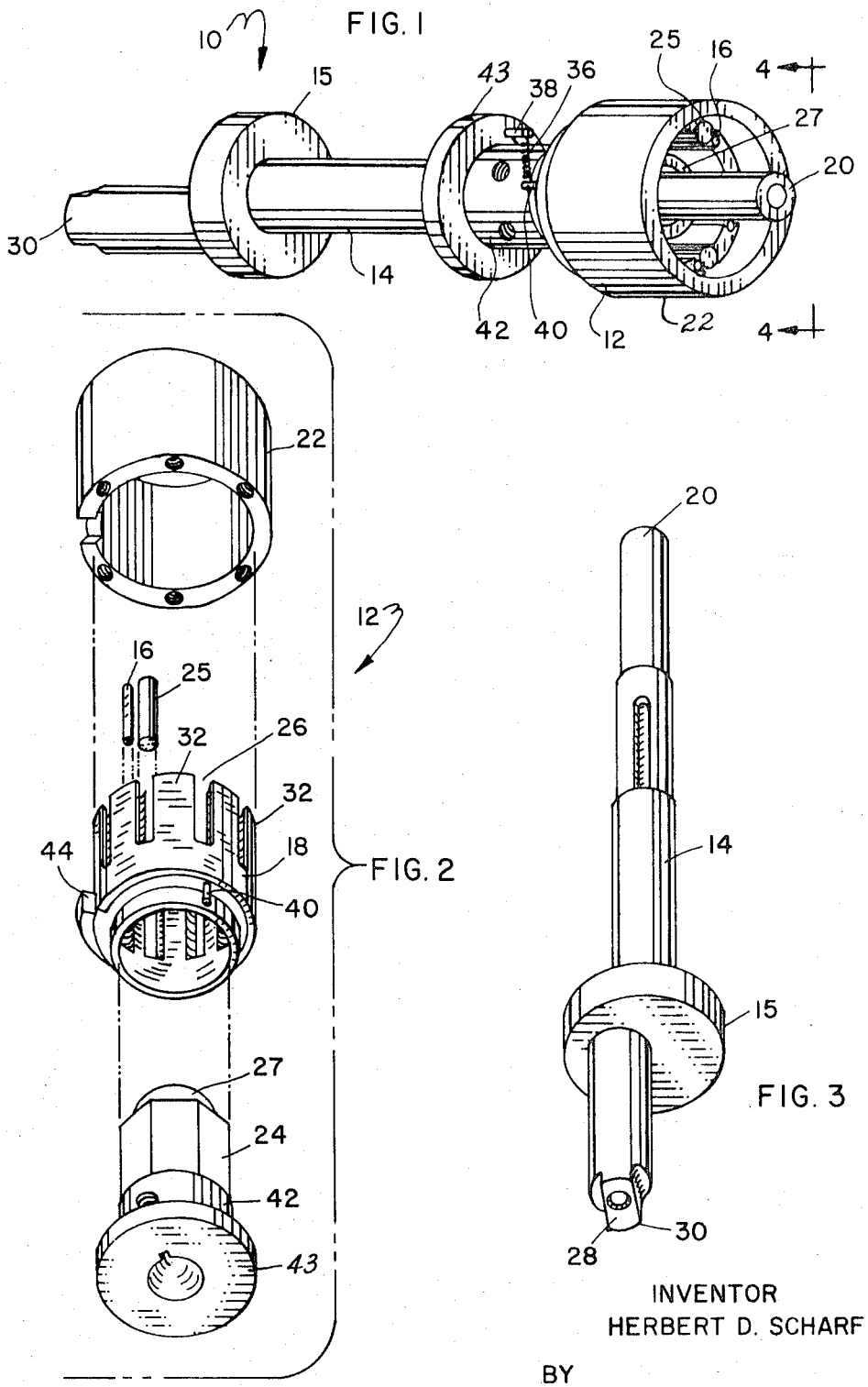

INVENTOR.
HERBERT D. SCHARF

ROLLER CLUTCH ASSEMBLY

This application is a continuation application based on U.S. application Ser. No. 47,465, filed June 18, 1970, and now abandoned and entitled "Roller Clutch."

This invention relates to a roller clutch assembly, and more particularly to a new and improved device of this general class.

It is known to provide a roller clutch assembly for transmitting motion from the flywheel ring to the cam of a crankshaft through drive rollers with the crankshaft being fitted with a flywheel in a conventional manner.

In theory, the rotation of the flywheel ring is transmitted through a plurality of drive rollers that are in bearing contact with both the cam and the ring. However, as a practical matter this does not occur since the cam and other parts can never be perfectly concentric because of normal manufacturing errors and wear in use. Instead, there is actual engagement usually only between one or two of the interposed drive rollers, cam and retainer. For this reason, the transfer of energy from the cam to the retainer is not inefficient, but the transfer actually proceeds in a type of eccentric manner which quickly leads to a wearing of the parts.

Thus, whereas eight drive rollers may be provided, in practice only one or two actually participate in the transfer of energy. It has been suggested that the drive rollers be spring loaded in some way so that they are urged in a positive manner into engagement with the cam and the retainer. The latest such attempt is set forth in U.S. Pat. No. 3,500,977 wherein the retainer body is formed of a moldable plastic so that certain lugs and spring-engaging surfaces may be integrally formed with the retainer body, and in this way it is hoped that the spring will be properly retained. HOwever, it is believed that the problem of spring breakage still remains as well as the trouble of building a special mold and selection of an appropriate plastic.

It is therefore an object of the present invention to provide a roller clutch assembly which completely eliminates the use of springs.

Still another object of the present invention is to provide a roller clutch assembly which enables the transfer of energy from the flywheel ring to the cam to proceed uniformly through all drive rollers.

Still another object of the present invention is to provide a roller clutch assembly that is essentially designed along conventional lines, thereby maintaining low cost, and yet incorporating novel features that can be easily introduced into the conventional roller clutch.

The foregoing as well as other objects of the invention are achieved by providing a roller clutch assembly wherein slots are formed in the retainer to receive lengths of flexible tubing, each corresponding to one of the drive rollers so that when the drive rollers are in actuated position, each drive roller bears against the flexible or resilient tubing such that the transfer of energy from the flywheel ring proceeds uniformly through each of the drive rollers to the cam. When the assembly is in disengaged position the cage retainer wall, through direct contact between the tubing and each individual roller urges the rollers against the next retainer arcuate wall and away from the rotating ring.

The foregoing as well as other objects of the invention will become more readily apparent by reference to the following views of the drawing wherein:

FIG. 1 is a perspective view showing a crankshaft fitted with the roller clutch assembly of the present invention;

FIG. 2 is an exploded perspective view showing the roller clutch assembly of FIG. 1;

FIG. 3 is a perspective view showing the crankshaft of FIG. 1;

Figure 4:
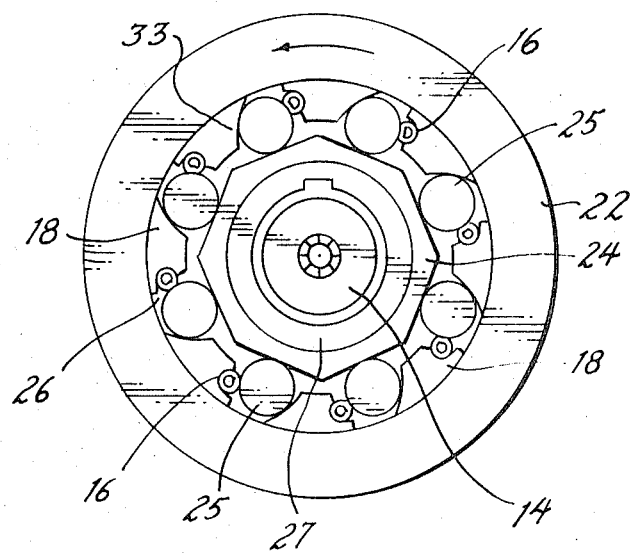
FIG. 4 is a front elevational view taken along the lines 4—4 of FIG. 1 showing the roller clutch assembly in a disengaged position.

Referring now in greater detail to the various figures of the drawing wherein like reference characters refer to like parts, there is shown at 10 in FIG. 1 a roller clutch assembly 12 constructed in accordance with the present invention and seated operationally on crankshaft 14.

As shown in greater detail in FIG. 2 the roller clutch assembly 12 consists of conventional parts in a conventional arrangement except for the introduction of flexible tubing 16 in slots formed in the retainer 18. The conventional flywheel, positioned at the rearward end 20 of the crankshaft 14, has not been shown in order to reveal the interior of the roller clutch pertinent to the present invention.

The conventional parts of the roller clutch 10 will only be briefly discussed since they are well known to those skilled in the art. In particular, the roller clutch 10 includes the retainer 18 that is housed within drive ring 22, with the retainer 18 being disposed in an annular fashion about cam 24 that is secured via flange 43 to the crankshaft 14 as will be discussed hereinafter.

Figure 5:
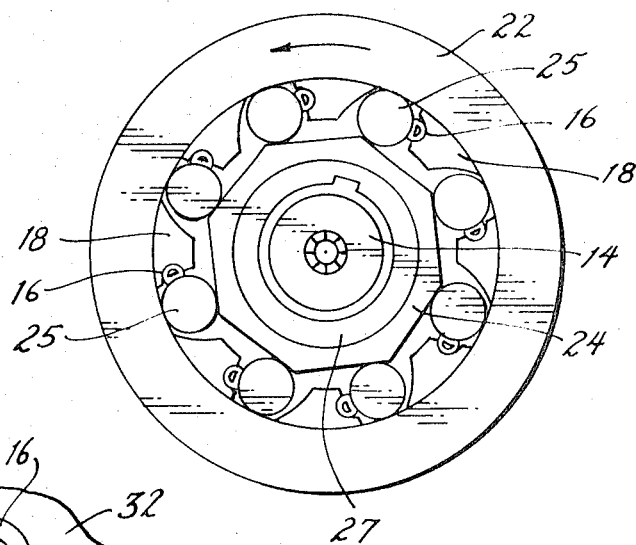
FIG. 5 is a view similar to FIG. 4, but wherein the roller clutch assembly is in the actuated position.

As further seen in FIG. 2, a plurality of drive rollers 25 (only one being shown) are provided in complementary openings 26 in the retainer. It will be readily apparent from FIG. 2 that the cam 24, the retainer 18 and the ring 22 fit together in a conventional manner as best seen in FIGS. 4 and 5. The cam 24 has an extension 27 as seen in FIGS. 1 and 2.

As seen in FIG. 3, the crankshaft 14 is of conventional construction including leading end 28 with flat collar 30 and stepped shaft sections as can be seen from FIG. 3. The cam 24 may be secured to the crankshaft 14 by a flange 43 in a conventional manner, with the retainer 18, drive rollers 25 and ring 22 slipped in place.

Figure 6:
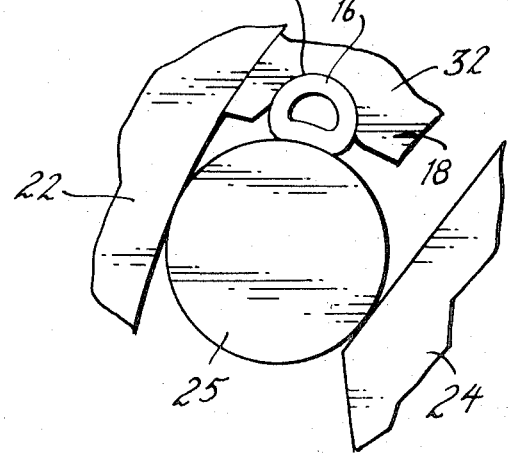
FIG. 6 is an enlarged view taken along the dashed circle of FIG. 5 showing the bearing contact between the drive roller and its associated length of tubing.

As best seen in FIG. 6 the retainer 18 possesses fingers 32. The fingers 32 each possess two interior surfaces, one of which is slotted to receive the tubing 16. The other interior surface of each finger 32 is formed in an arc 33 so that as shown in FIG. 4 the roller 25 will be urged against the arcuate edge 33 by pressure of a finger 32 when the cam 24 is in the deactivated condition. However, when the retainer 18 is rotated approximately 16° in a counterclockwise sense to reach the position of FIG. 5, the rollers 25 are forced into driving engagement with ring 22. In both positions of FIGS. 4 and 5 the rollers are in good engagement with their complementary tubing 16. Also, the arcuate edge 33 is so shaped that in the disengaged position of FIG. 4 the pressure of fingers 32 tends to force the rollers away from rotating ring 22.

Because of the resilient nature of the flexible tubing 16 it will usually simply suffice to have the tubing 16 held by friction in the slot 34 but, of course, other attachment or holding aids may be used if necessary. It will be seen that the slot 34 can be formed in a milling operation.

Alternatively, the retainer 18 may be cast or molded in such a way as to possess not only openings 26 for the drive rollers 25, but also slots 34 for the resilient tubing 16. It will be further seen from FIG. 2 that the length of the resilient tubing is approximately the same or slightly less than the length of the drive roller 25.

The flexible tubing 16 may be either hollow or in some cases solid so long as some resilient qualities are retained. The tubing is preferably hollow and made from a polyurethane material although it will occur to those skilled in the art that there are many other materials presently available or which will become available from which the tubing 16 may be formed. As a further example of such materials there is vinyl chloride, vinylidene chloride, polyethylene, polytetrafluoro ethylene, natural and synthetic rubbers and a host of other materials.

In operation the roller clutch is brought from the disengaged position of FIG. 4 to the actuated position of FIG. 5 under the pressure of spring 36.

It will be seen from FIG. 4 that the rollers 25 in the released position are located approximately midway between the flats of the cam 24. In FIG. 4 each roller 25 makes three-point contact with (1) the flat of cam 24, (2) the tubing 16 and (3) the arcuate surface 33 of the retainer 18. It is to be noted that in FIG. 4 the rollers 25 do not contact the ring 22 which is constantly rotating because the ring 22 is a part of the flywheel assembly. Since there is no contact between the rollers 25 and the ring 22, the rollers 25 cannot be driven by the ring 22.

However, when the retainer is rotated approximately 16° in a counterclockwise sense to the position of FIG. 5, the rollers 25 are wedged up into contact with the ring 22. In either FIG. 4 or FIG. 5 there is strong contact between the tubing 16 and the rollers 25 as seen in FIG. 6.

In the position of FIG. 5 there is no contact with the rollers 25 and the very next retainer arcuate wall 33, although such contact existed in FIG. 4. Thus, in FIG. 5 there is a different three-point contact from FIG. 4. In FIG. 5 the rollers 25 are in contact with the ring 22, the tubing 16 and the cam 24.

At the end of the driving stroke, the retainer 18 is forced against the pressure of spring 36 to return to the position of FIG. 4.

As seen in FIG. 1, there is a spring 36 that extends from a post 38 on the cam 24 to a post 40 on the retainer 18 (FIG. 2). In many cases the spring 36 passes around almost the entire outer body 42 of the cam 24 in extending from the post 38 to the post 40. A stop 44 is also provided on the body of the retainer 18 (FIG. 2).

In operation the retainer 18 is brought to the actuated position of FIG. 5 under the pressure of spring 36 that is stronger than the pressure exerted by the eight pieces of tubing 16. The roller clutch is deactivated by directing a force to oppose spring 36 and cause it to be wound around almost the entire body 42 so that the spring 36 is ready to cause the next actuation of the roller clutch, all in accordance with conventional roller clutch practice.

Without further elaboration, the foregoing will so fully illustrate my invention that others may, by applying current or future knowledge, readily adapt the same for use under various conditions of service.

What is claimed as the invention is:

1. In a roller clutch assembly, including a cam and an annularly disposed drive ring, drive rollers interposed between the cam and the ring, and a retainer provided to coact with said cam to urge the rollers into or out of driving position with respect to the ring, depending upon the action of said cam, the improvement comprising providing the retainer with first and second walls, forming slots in the retainer first walls with said slots running generally parallel to the axis of said rollers, said slots receiving resilient tubing whereby the axis of said tubing is generally perpendicular to the movement of said drive rollers when said rollers are brought from disengaged to driving position by said retainer such that said tubing in each of said slots is contacted by a roller as the roller is urged by said retainer into driving engagement with said drive ring, said retainer second wall having an arcuate shape so that when the roller cage is moved to disengaged position, said retainer arcuate wall urges said roller against said tubing but away from said drive ring to maintain a disengaged condition until said retainer is again moved into driving engagement.

2. The roller clutch assembly of claim 1 wherein said tubing is hollow.

3. The roller clutch assembly of claim 1 wherein said tubing is made of polyurethane.

* * * * *